Figure 1:
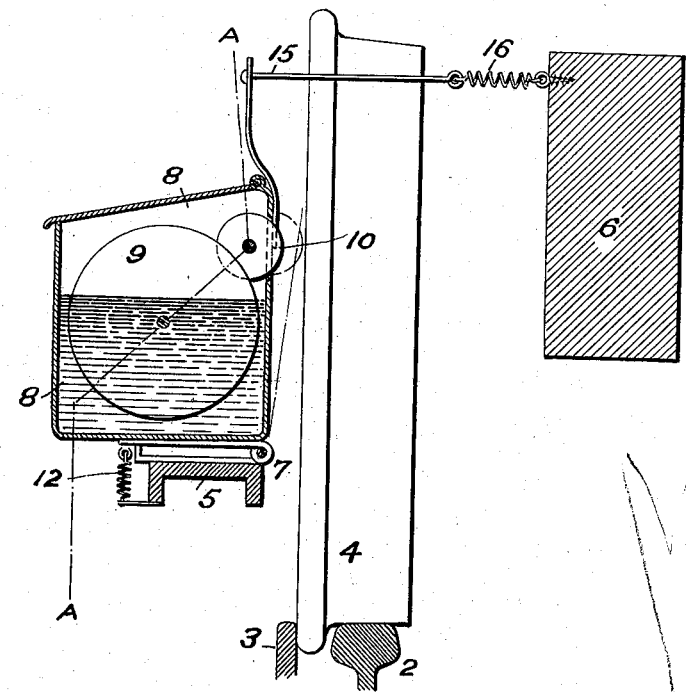

No. 893,193. PATENTED JULY 14, 1908.
F. G. PHILLIPS.
WHEEL FLANGE OILER.
APPLICATION FILED FEB. 27, 1908.

WITNESSES:
Charles H. Wagner.
H. Woodard

INVENTOR
FRANK G. PHILLIPS
BY
Fred G. Dieterich
ATTORNEY

UNITED STATES PATENT OFFICE.

FRANK G. PHILLIPS, OF HARRISON MILLS, BRITISH COLUMBIA, CANADA.

WHEEL-FLANGE OILER.

No. 893,193.  Specification of Letters Patent.  Patented July 14, 1908.

Application filed February 27, 1908. Serial No. 418,105.

*To all whom it may concern:*

Be it known that I, FRANK G. PHILLIPS, citizen of the Dominion of Canada, residing at Harrison Mills, in the Province of British Columbia, Canada, have invented a new and useful Improvement in Wheel-Flange Oilers, of which the following is a specification.

This invention relates to a device for applying oil or grease to the outer side of the flange of a wheel of a tram car or street railway vehicle, where such are required to pass round curves of small radius having the protection of guard or check rails.

In street railways in order to avoid the grinding friction of the wheel flanges against guard rails in passing round the curves so provided, crude oil or grease is applied to the inner side of the guard rail by a man detailed for that purpose, and it is to avoid the necessity for this personal application and to enable the same to be made automatically, that I have invented the device which is the subject of this application. In it I furnish an oil or grease receptacle secured to the wheel truck of the car which receptacle is provided with wheels in frictional contact with one another which when pressed into contact with the flange of the car wheel will apply the grease to the side of it which bears against the guard rail. This contact application may when so desired be automatically performed by the movement of the wheel truck in relation to the car frame, when the vehicle is passing round a curve. So that the oil or grease is not applied except when required, and is applied directly to where it is needed without the risk of it getting on the tread of the wheels as is frequently the case when attempt is made to apply the grease to the rail.

Figure 2:
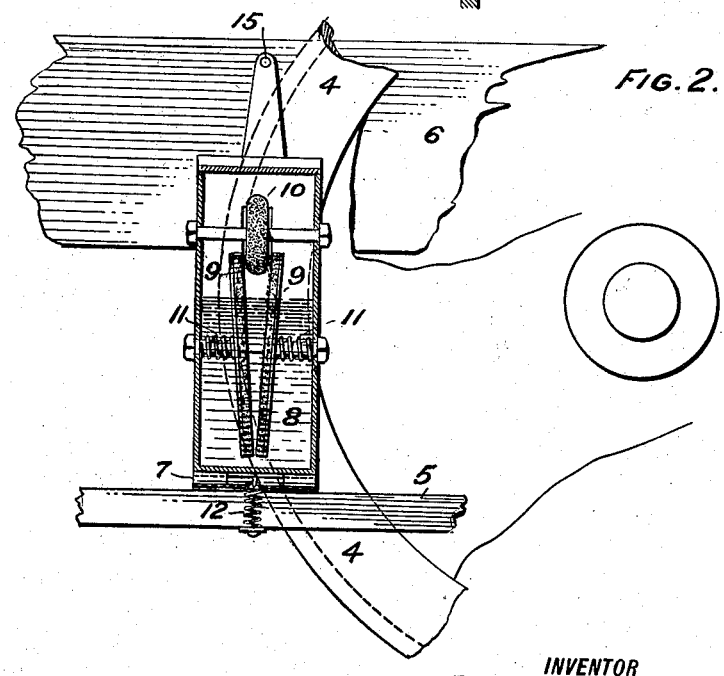

The invention is particularly described in the following specification, and illustrated in the drawings which accompany it, in which:

Figure 1 is a vertical cross section on a plane normal to the plane of rotation of the car wheel, and Fig. 2, a section on the line A A in Fig. 1.

In these drawings 2 represents the track rail, 3 the guard rail, 4 the flange of the vehicle wheel, 5 the wheel truck frame, and 6 the frame of the car.

Mounted on a hinge pin 7 on the truck frame 5 adjacent to the wheel flange 4 is an oil receptacle 8 having rotatably mounted within it one or more oil lifting wheels 9. The lower part of the wheel or wheels 9 dips into the crude oil or grease in the receptacle 8 and transfers it to an applying wheel 10 rotatably mounted in the upper part of the receptacle 8, which wheel 10 is in driving contact with the wheel or wheels 9 and projects through an aperture in the side of the receptacle toward the wheel flange 4.

When it is required to oil the wheel flange 4 the receptacle may be tilted toward it so as to bring the applying wheel 10 in contact with the flange, when the rotation of the wheels 10 and 9 by such contact will lift the oil from the receptacle and apply it to the outside of the flange 4.

The receptacle 8 may be retained in its normal position with its wheel 10 clear of the flange 4 by a light spring 12, and the tilting when required may be effected in any suitable manner. In four wheeled vehicles this may be done by a mechanism operated by the motorman, but with cars the wheels of which are mounted in trucks, I prefer that the oiling device be operative automatically by the movement of the frame 5 of the truck in relation to the frame 6 of the car when the truck wheels strike a curve. This movement may be effected in any suitable manner: In the drawings herewith the receptacle 8 is shown as being connected to the frame 6 of the car by a rod or cord 15, a spring 16 being interposed in the connection that will yield to any movement of the truck frame in excess of what is required to bring the applying wheel 10 in rotatable contact with the wheel flange 4; but the same movement may be performed by bell crank or cam under the free edge of the oil receptacle and connected by a cord to the car frame 6.

In the operation of the device, as may have been gathered from the foregoing description, when the car approaches a curve provided with guard rails, the device may be tilted against the resistance of the spring 12 to bring the applying wheel 10 into contact with the flange 4 of the car wheel, either by a voluntary act on the part of the motorman, or automatically by the movement of the wheel truck 5 in relation to the car frame 6 when the truck takes the curve; and as soon as the curve is passed and the trucks resume their normal position in relation to the car frame, the oil receptacle 8 under the influence of the spring 12 resumes its normal position with its applying wheel 10 clear of the wheel flange.

The wheels 9 and 10 may be of open fiber or brush, as affording a better means of lifting and transferring the oil, and the wheel 9 may be double with springs 11 to press them together and into driving contact with the wheel 10 inserted between them, but I do not desire to be confined to the particular construction of the oil transferring wheels or the manner shown of tilting the receptacle 8 to bring the applying wheel 10 into contact with the wheel flange, as such may be varied to suit the requirements.

The essential feature of the invention lies in the provision of an oil receptacle and applying wheels which may when required be tilted into contact with the wheel flange and susceptible of being operated by the movement of the wheel truck in relation to the car frame when the former takes a curve.

Having now particularly described my invention and the manner of its operation, I hereby declare that what I claim as new and desire to be protected in by Letters Patent, is:

1. As a means for applying oil or grease to the wheel flange of a vehicle, a receptacle flexibly mounted on the wheel carrying frame adjacent to a wheel flange, a lifting wheel or wheels rotatably mounted in said receptacle, an applying wheel in driving contact with the aforementioned lifting wheel and projecting through the side of the receptacle toward the wheel flange, and means for tilting the receptacle toward the flange so as to bring the applying wheel into driving contact therewith.

2. In a device of the class described, an oil or grease carrying receptacle mounted by a hinge on the wheel carrying truck of a car adjacent to the flange of one of its wheels, a wheel or wheels rotatably mounted in the receptacle, an applying wheel rotatably mounted thereabove and in driving contact therewith said applying wheel projecting through an aperture in the receptacle toward the wheel flange, means for maintaining the receptacle with its applying wheel out of contact with the wheel flange, and means for yieldingly tilting the receptacle to bring the applying wheel into driving contact with the wheel flange said means being operative by the movement of the truck frame in relation to the movement of the car frame.

In testimony whereof I have signed my name to this specification in the presence of two subscribing witnesses.

FRANK G. PHILLIPS.

Witnesses:
 ROWLAND BRITTAIN,
 CLIVE S. CARMAN.